No. 763,228. PATENTED JUNE 21, 1904.
B. WALKER, Jr.
FLUSHING TANK.
APPLICATION FILED AUG. 8, 1903.
NO MODEL.
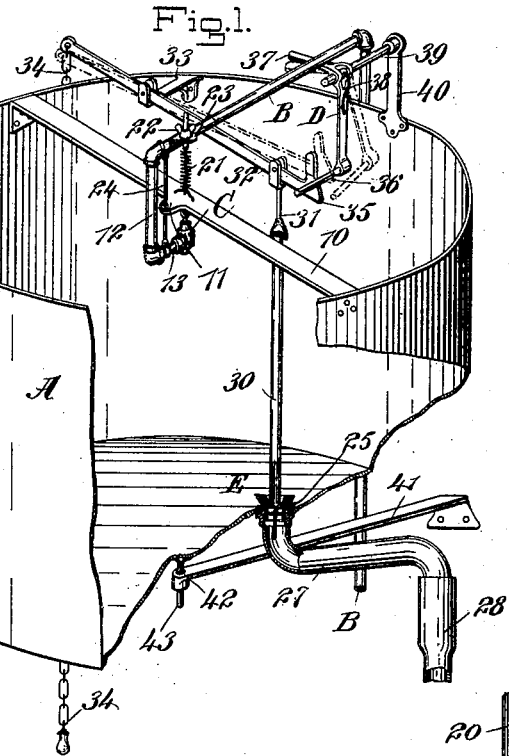
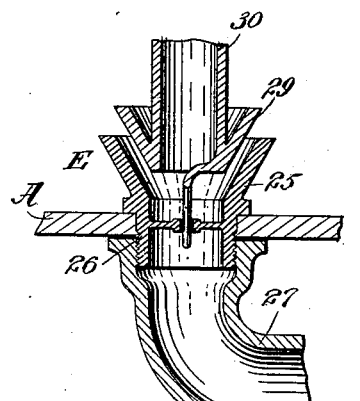
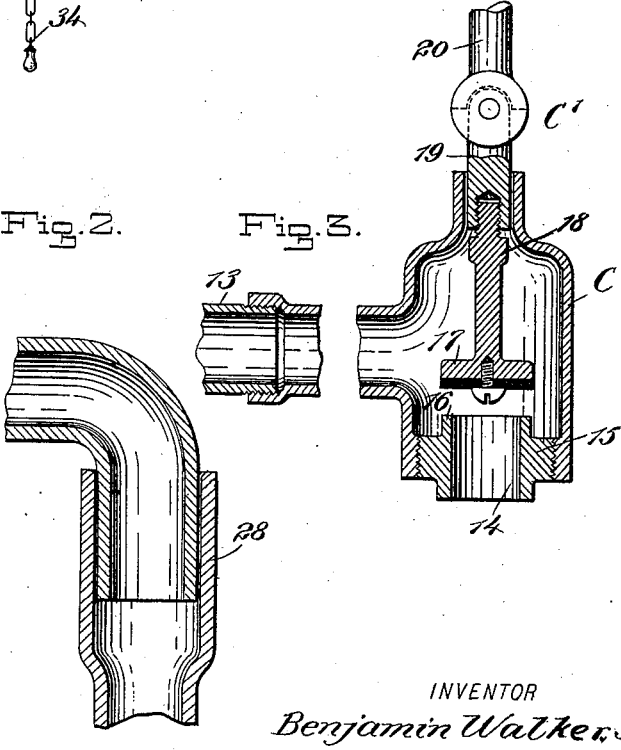
WITNESSES:
INVENTOR
Benjamin Walker, Jr.
BY
ATTORNEYS No. 763,228.

Patented June 21, 1904.

UNITED STATES PATENT OFFICE.

BENJAMIN WALKER, JR., OF AUSTIN, TEXAS.

FLUSHING-TANK.

SPECIFICATION forming part of Letters Patent No. 763,228, dated June 21, 1904.

Application filed August 8, 1903. Serial No. 168,784. (No model.)

*To all whom it may concern:*

Be it known that I, BENJAMIN WALKER, Jr., a citizen of the United States, and a resident of Austin, in the county of Travis and State of Texas, have invented a new and Improved Flushing-Tank, of which the following is a full, clear, and exact description.

The purpose of the invention is to provide means whereby the water-supply to the tank is automatically controlled by the difference in the weight of the tank when empty and when full of water.

Another purpose of the invention is to provide means whereby the water may be led out of the tank through an outlet-pipe having slip connection with a fixed flushing-pipe, which outlet-pipe is automatically closed by the upward action of the tank, and to provide an overflow-pipe in connection with the closing or valve device for the outlet-pipe whereby to regulate the amount of water to be received by the tank and to obviate the pounding noise so common to flushing-tanks, due largely to the siphons employed sucking air and water just as the siphonage is broken.

Another purpose of the invention is to construct a flushing-tank which is spring-supported and to provide a slide-valve controlled directly by the action of the tank in rising and falling, the said slide-valve controlling the supply of water to the tank, the connection between the said valve and the said tank being such that as the water for flushing purposes leaves the tank the tank will be raised by the action of its supporting-spring and as the tank descends it acts automatically to stop the flow of water to the tank and as the tank rises the water is automatically turned on to supply the tank.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a sectional perspective view of a flushing-tank and connected parts, illustrating the application of my improvements.

Fig. 2 is an enlarged vertical section through a portion of the bottom of the tank, a portion of the valve controlling the outlet of water from the tank, and likewise a section through a portion of the flushing-pipe and a section through the connecting-pipe between the flushing-pipe and the valve; and Fig. 3 is a detail vertical section through the slide-valve adapted to regulate the supply of water to the tank and likewise a section through a portion of the connected water-supply pipe.

A represents a tank, which may be of any approved construction, and, as shown, the tank is of circular formation. The said tank is open at the top, being otherwise closed. At the top of the tank a cross-bar 10 is securely fastened at its ends to the tank, and at the center of the said cross-bar a horizontal lip 11 is formed, having an aperture produced therein, as is shown in Fig. 1.

The water-supply pipe B is secured in any suitable manner to any proper support and extends over the tank to a point at or near its center. The said water-supply pipe is provided with a downwardly-extending member 12 and a lateral or horizontal branch 13, and on this lateral or horizontal branch 13 a valve C is located.

The valve consists of a suitable casing, as is shown in Fig. 3, having an opening 14 at its bottom, which opening is produced, preferably, in a detachable plug 15 at the lower portion of the casing, and the said plug at its upper portion within the casing is provided with an annular flange 16, upon which a valve 17 is adapted to be seated, the stem 18 whereof is attached in any suitable or approved manner, usually adjustable, to the two-piece connecting-rod C′, also shown in Fig. 3, the members of which rod are pivotally connected and are designated as 19 and 20. The upper member 20 of the connecting-rod is secured to the cross-bar 10 at the upper portion of the tank A.

The tank A is supported by means of a spring 21, which spring at its lower end is secured to the cross-bar 10 at its center or where the lip 11 is formed, and the upper end of the said spring is held by means of a rod and thumb-nut 22, passed through a bracket 23 extending from the water-supply pipe B, as is also shown in Fig. 1. The tank A has no other support than the spring 21, and when the weight of the water in the tank overcomes the tension of the spring 21 the tank drops downward. When the tank is empty, or comparatively so, the spring 21, reasserting itself, raises the said tank.

In order that the tank shall not have lateral movement at its upper portion and shall have a suitable guide at such point, a vertical rod 24 is carried down from the upper horizontal and main section of the water-supply pipe B to the lower horizontal branch 13, passing through the aperture in the lip 11, as is shown in Fig. 1.

In the bottom of the tank a cup 25 is located, preferably of conical formation, and the said cup extends through the bottom to a point beyond its under surface, as is shown in Fig. 2, and in the downwardly-extending portion of the cup a spider 26 is located. A connecting or conducting pipe 27 is attached to the lower end of the extension from the cup 25, and this conducting-pipe 27 is preferably of curved or S formation, and its lower end is mounted to slide freely in the upper end of the flushing-pipe 28, which flushing-pipe is securely fastened to any convenient support.

The cup 25, which forms one portion of a valve E, is adapted to receive a conical plug 29, through which an overflow-pipe 30 extends, the said overflow-pipe being open at its top and at its bottom, so that the said overflow-pipe at its lower portion is in direct communication with the conducting or connecting pipe 27 and the flushing-pipe 28. The upper end of the overflow-pipe 30 is placed within a predetermined distance of the top of the tank A and is pivotally connected with a link 31, which link in its turn is pivotally attached to the inner end of a lever 32. The said lever 32 is fulcrumed between its center and its outer end upon a bracket 33, secured to the tank A, as is shown in Fig. 1. The outer end of the lever 32 extends beyond the outer face of the tank A, and a chain, cord, or cable 34 is attached to the outer end of the said lever 32, extending downward sufficiently to be conveniently reached by the operator, and when the chain 34 is drawn downward the inner end of the lever 32 is raised.

At the inner end of the lever 32 an upwardly-extending head 35 is formed, as is also shown in Fig. 1, and the outer vertical edge of the said head is more or less inclined, as is also shown in the same view.

The inclined portion of the head 35 is normally engaged by a horizontal member 36, which extends from the lower end of an angle or elbow lever D, the upper horizontal member 37 of which elbow-lever extends below the upper or main section of the water-supply pipe B, as is also shown in Fig. 1, and the lower member 36 of this lever D is held in engagement with the head 35 of the lower or horizontal lever 32 by means of a spring 38 of any suitable character. The elbow-lever D where its vertical and upper horizontal members connect is pivoted upon a horizontal stud 39, which extends over the upper portion of the tank A and is duly supported by a standard 40, attached to the said tank, as is also shown in Fig. 1.

In order that the lower portion of the tank A shall be guided in its vertical movement and prevented from having swaying or lateral movement at its lower portion, a bracket 41 is secured to a near-by support. The said bracket extends beneath the lower portion of the tank, preferably to a point at or near its center, terminating in an eye 42, and in this eye 42 a pin 43 has free vertical movement, which pin is attached to the bottom portion of the tank A, as is most clearly shown in Fig. 1.

In the operation of the tank, it having been practically filled with water, the tank drops downward, expanding the spring 21 and causing the valve 17 in the casing C to seat itself, thus cutting off the water-supply. When water is required for flushing purposes, the chain 34 is pulled downward, raising the inner end of the lever 32, thus carrying the member 36 of the elbow-lever D, engaging with the head of the lever 32, outward to the dotted position shown in Fig. 1, and as the lever 32, which may be termed a "flushing-lever," has been fully raised the member 36 of the controlling or elbow lever D will enter beneath the head portion of the flushing-lever 32 and hold the latter lever at its inner end in an upper position, thus causing the plug-section 29 of the valve E to be withdrawn from the cup-section 25 of the said valve, permitting the water in the tank to flow out into the flushing-pipe 28. When the tank is thus comparatively empty, the spring 21 will draw the tank upward practically to its normal position, and as the tank is drawn upward the valve 17 in the casing C is unseated and water from the supply-pipe will enter the tank to refill the same. As the tank A rises upward the upper horizontal member 37 of the controlling-lever D will engage with the water-supply pipe B and will again throw the lower member 36 of the said controlling-lever D from engagement with the flushing-lever 32, permitting the said lever to resume its normal position and the plug-section 29 of the outlet-valve E to seat itself in the cup-section of the said valve.

The overflow or stand pipe or tube 30 is adapted to prevent the water from rising in the tank A beyond a certain level, and when such level is reached should an extra supply of water be admitted to the tank such extra supply will flow into the said stand or overflow pipe or tube and will find an exit through the flushing-pipe 28.

Having thus described my invention, I claim as new and desire to secure by Letters Patent—

1. A spring-supported tank, a water-supply pipe for the tank, a valve for the water-supply pipe automatically controlled by the movement of the tank, an outlet-valve for the tank, means for opening the same, and means for automatically holding it open a predetermined length of time, said valve being closed automatically by the upward movement of the tank.

2. A spring-supported tank, a water-supply pipe for the tank, a valve for the water-supply pipe automatically controlled by the movement of the tank, an outlet-valve for the tank, means for opening the same, and means for automatically holding it open a predetermined length of time, said valve being closed automatically by the upward movement of the tank, and the inlet-valve being automatically and simultaneously opened by the same movement of the tank.

3. A spring-supported tank, a water-supply pipe for the tank, a valve for the water-supply pipe, opened and closed by the movement of the tank, an outlet-valve for the tank, and means for automatically opening the said valve, the outlet-valve being closed automatically by the upward movement of the tank, as described.

4. In a spring-supported tank, an outlet-valve held normally closed, a movable member for opening said valve, and a latch adapted to engage said movable member when moved to open the outlet-valve to hold said outlet-valve open, said latch being adapted to move up and down with the tank and having a free arm adapted to engage a fixed projection when the tank moves upwardly to disengage the latch from said movable member to permit the outlet-valve to close.

5. A flushing-tank, a water-supply pipe for the said tank, a spring-support between the water-supply pipe and the tank, a water-supply valve carried by the water-supply pipe, opened and closed by the movement of the tank, an outlet-valve in the bottom of the tank, a flushing-tube, a sliding connection between the outlet-valve and the flushing-tube, an overflow-pipe forming a portion of the outlet-valve, a lever connected with the overflow-tube, whereby to operate the outlet-valve, and a controlling-lever for the said flushing-lever, operated in one direction by the movement of the flushing-lever and in another direction by the upward movement of the tank, as set forth.

6. In a spring-supported tank, an outlet-valve held normally closed by gravity, a pivoted lever for opening said valve, said lever being fulcrumed on the tank and connected to said valve between the inner end of said lever and its fulcrum-point, the extreme inner end of said lever being formed with an inclined face, and a spring-actuated elbow-lever supported upon the tank with one of its free ends normally bearing against said face to form a latch to engage said lever when the same is moved into position to open the outlet-valve, the other free end of said elbow-lever being adapted to engage a fixed projection when the tank moves upwardly, by reason of being emptied of its contents, whereby to disengage said latch from said operating-lever to permit the outlet-valve to close.

7. In a spring-supported tank, a stationary water-supply pipe overreaching the tank, and having a downwardly-extending vertical section at its inner end, and a short terminal section at the lower end of said vertical section extending parallel with said overreaching pipe, an inlet-valve at the inner end of said terminal section, a transverse bar rigidly connected to the tank, a vertical rod connecting the inner end of said overreaching pipe with said terminal section, said transverse bar having an opening and said vertical rod passing through said opening to form a guide for the transverse bar, a spring connecting said transverse bar with said overreaching water-supply pipe to support said tank suspended from said pipe, and a connection between said inlet-valve and said transverse bar, said valve being adapted to be opened by said transverse bar when the tank ascends and to be closed when the tank descends.

In testimony whereof I have signed my name to this specification in the presence of two subscribing witnesses.

BENJAMIN WALKER, Jr.

Witnesses:
BEN WALKER,
J. J. WALKER.